US012747933B2

(12) United States Patent
Davidson et al.

(10) Patent No.: US 12,747,933 B2

(45) Date of Patent: Sep. 29, 2026

(54) DRONE COUNTER-SWARM DEVICES AND METHODS

(71) Applicants: Utah State University Space Dynamics Laboratory, North Logan, UT (US); Fireworks West Internationale Inc, Logan, UT (US)

(72) Inventors: Morgan Davidson, River Heights, UT (US); Joshua Dimond, Logan, UT (US); Tim Nielsen, Logan, UT (US); Dustin Burch, Logan, UT (US)

(73) Assignees: Utah State University Space Dynamics Laboratory, North Logan, UT (US); Fireworks West Internationale Inc, Logan, UT (US)

( * ) Notice: Subject to any disclaimer, the term of this patent is extended or adjusted under 35 U.S.C. 154(b) by 0 days.

(21) Appl. No.: 18/606,920

(22) Filed: Mar. 15, 2024

(65) Prior Publication Data

US 2026/0139930 A1 May 21, 2026

Related U.S. Application Data

(63) Continuation-in-part of application No. 18/540,555, filed on Dec. 14, 2023, now abandoned, which is a continuation of application No. 17/840,407, filed on Jun. 14, 2022, now Pat. No. 11,892,271.

(60) Provisional application No. 63/202,505, filed on Jun. 14, 2021.

(51) Int. Cl.

| | |
|---|---|
| *F41H 11/00* | (2006.01) |
| *B64U 10/13* | (2023.01) |
| *F41A 21/30* | (2006.01) |
| *F42B 4/00* | (2006.01) |
| *G01V 1/38* | (2006.01) |

(52) U.S. Cl.

CPC ............. *F41H 11/00* (2013.01); *B64U 10/13* (2023.01); *F41A 21/30* (2013.01); *F42B 4/00* (2013.01); *G01V 1/3808* (2013.01); *G01V 1/3826* (2013.01); *G01V 1/3835* (2013.01)

(58) Field of Classification Search

CPC .......... F41H 11/00; F41H 13/006; F42B 4/00; F42B 5/15

See application file for complete search history.

(56) References Cited

U.S. PATENT DOCUMENTS

| | | | | |
|---|---|---|---|---|
| 10,703,451 | B1 * | 7/2020 | Adams | F41F 3/10 |
| 11,892,271 | B2 * | 2/2024 | Davidson | F41H 11/00 |
| 2024/0142202 | A1 * | 5/2024 | Davidson | F42B 4/22 |

* cited by examiner

*Primary Examiner* — J. Woodrow Eldred

(57) ABSTRACT

A counter-swarm device comprises a mortar tube with an opening on one end, multiple streamers positioned in the mortar tube, a cone positioned below the multiple streamers in the mortar tube, the cone pointing towards the mortar-tube opening, a kick charge positioned below the cone. The cone is configured to disperse the multiple streamers upon discharge of the kick charge.

20 Claims, 11 Drawing Sheets

DRONE COUNTER-SWARM DEVICES AND METHODS

RELATED APPLICATIONS

This application is a continuation-in-part and claims priority to U.S. Non-Provisional application Ser. No. 18/540,555, filed Dec. 14, 2023, which is a continuation of and claims priority to U.S. Non-Provisional application Ser. No. 17/840,407, filed Jun. 14, 2022, which claims the benefit of and priority to U.S. Provisional Patent Application No. 63/202,505, filed Jun. 14, 2021, all of which are hereby incorporated by reference in their entirety.

GOVERNMENT SPONSORED RESEARCH

This invention was made with government support under contract N00173-22-F-2026 awarded by Naval Research Laboratory. The government has certain rights in the invention.

TECHNICAL FIELD

The present disclosure relates to counter-drone technologies, and more particularly to counter-drone devices and systems that deploy streamers that entangle propellers of a drone or unmanned aerial vehicle (UAV).

BACKGROUND

The use of unmanned aerial vehicles (UAVs—also referred to as drones) and unmanned aerial systems (UASs) has become more prevalent in many applications, including in military applications where the UAVs are used for surveillance, direct attack, and even employment of artillery. Technologies and defenses have been developed to counter UAVs to reduce their impact in military and other settings. The counter-UAV efforts may also be referred to as counter-swarm or C-SWARM when engaging several UAVs. The counter-swarm community has developed consensus around the idea that a layered defense is a sensical approach. This approach provides higher likelihood of success against a wide range of threat scenarios through the application of complementary counter-swarm technologies.

Counter-swarm system architects are currently faced with difficult choices, often weighing competing factors in the search for appropriate combinations of technology to apply to each layer. Experts also agree that at least some of the innermost layers of a counter-swarm defense should include hard kill technologies (e.g., kinetic or directed energy) for close-in engagement. Requirements for an innermost layer of a counter-swarm defense may include consistent effectiveness, scalability, persistence for lasting effect in aerial denial, low-cost in comparison to the enemy swarm, and low collateral for use around blue force and/or civilians.

Guns, remote weapons systems (RWS), and similar kinetic systems are only effective against one target at a time. Therefore, serial engagement of individual swarm members using these technologies extends the counter-swarm time-to-intercept well past the point of practicality, even with modest swarm populations. High-energy laser systems and high-power microwaves suffer from similar serial targeting/engagement limitations, along with airspace deconfliction issues (e.g., for preventing fratricide) and high cost. Drone versus drone methods may be effective in small numbers, but quickly become unwieldy and expensive as the invading swarm size grows. Electronic warfare approaches have diminished in effectiveness over time, and they continue to do so in light of development of radio frequency (RF) dark drones/swarms.

Based on the current state of the art, in scenarios where the outermost areas of a counter-swarm system have been compromised by, for example, a massive or even moderately-sized swarm, today's counter-swarm planners have no viable solutions. Enemy swarms have a higher likelihood of success in today's conflicts.

SUMMARY

Applicants have identified the need for a viable technology for use in the multiple layers of counter-swarm defenses that meet the requirements noted above. The present disclosure in aspects and embodiments addresses these various needs and problems.

The use of optimized entanglement effectors have been shown to be a practical technology that delivers performance and affordability in counter-swarm scenarios while remaining persistent, scalable, and low collateral. This capability may help deter, dissuade, prevent, or stop adversaries from using military or terrorist swarm aggression against high value targets and interests. Because propellers on a UAV are standard features, entanglement of the propellers is one option for disabling the UAV. While propellers can be guarded by design, the fact remains that thrust is required for operation of UAVs, and air flow must be maintained in the production of thrust. If the propeller air flow is interrupted, the propeller can no longer provide the required thrust, and the UAV cannot continue to execute its mission. Optimized, persistent entanglement effectors (e.g., a streamer or thread) are effective for kinetic takedown of UAVs. The material and geometry of the effectors are engineered such that every streamer is consistently effective in interrupting propeller thrust of the UAV if delivered to a location where entanglement with a propeller is most likely to occur. The effector may also be optimized for persistence in the air, relatively low cost, and scalable to many possible applications through selection of appropriate material and geometry.

The present disclosure is directed to delivery methods that are optimized to ensure relatively fast and appropriate deployment of a cloud of these effectors. The resulting geometry of the cloud of effectors is engineered to ensure a more optimal likelihood of interaction with UAV propellers while providing desired coverage. A single cloud of effectors can be deployed versus a low number of UAVs, or multiple clouds of effectors can be employed in optimal ways against swarms of UAVs. The solutions disclosed herein may provide a scalable, low-collateral approach that can be used in urban areas and around blue forces as well as in other more technical and/or combat areas.

Assuming that an optimized entanglement effector and appropriate delivery systems can be achieved in accordance with the principals disclosed herein, then counter-swarm system architects may have viable candidates for multiple layers of a counter-swarm system. The technologies disclosed herein may directly reduce the significant risk currently posed by enemy UAV swarms thereby providing multiple, effective counter-swarm layers. The solutions disclosed herein may provide a measurable benefit in a variety of applications including war fighter, homeland security, and law enforcement communities by providing a way to deter, dissuade, or prevent adversaries from using UAV swarm aggression.

One aspect of the present disclosure is directed to a counter-swarm device. In embodiments, a counter-swarm device 100, comprises a mortar tube with an opening on one end, multiple streamers positioned in the mortar tube, a cone positioned below the multiple streamers in the mortar tube, the cone pointing towards the mortar-tube opening, a kick charge positioned below the cone. In this embodiment, the cone is configured to disperse the multiple streamers upon discharge of the kick charge.

In another embodiment of a counter-swarm device, the cone further includes a cylindrical body extending below the cone. The cone and its cylindrical body contain a fire-suppressant wad and the kick charge is positioned below the fire-suppressant wad.

In another embodiment of a counter-swarm device, the cylindrical body comprises venting holes formed in the cylindrical body that are configured to direct away from the multiple streamers hot gasses created by the discharge of the kick charge.

In another embodiment of a counter-swarm device, the cone is part of a shell casing, the multiple streamers are positioned within the shell casing, the kick charge is configured to launch the shell casing and the multiple streamers within the shell casing (30), and a burst charge is positioned within the shell casing, surrounded by the multiple streamers, and configured to disperse the multiple streamers when discharged.

In another embodiment of a counter-swarm device, a fire-suppression wad is positioned between the burst charge and the multiple streamers, the fire suppression wad is configured to suppress heat generated by the discharge of the burst charge.

In another embodiment of a counter-swarm device, the shell casing further comprises rotating bands configured to spin the shell casing as it exits the mortar tube.

In another embodiment of a counter-swarm device, the shell casing further comprises fold-out fins configured to fold out from the shell casing and spin the shell casing after exiting the mortar tube.

In another embodiment of a counter-swarm device, the kick charge and the cone are configured to disperse the multiple streamers at a full-deployment state into a streamer-cloud volume greater than 1397 m^3.

In another embodiment of a counter-swarm device, the kick charge comprises more than 100 grams of black powder.

In another embodiment of a counter-swarm device, at least one of the multiple streamers comprises at least a first, second, and third streamer. The second streamer is wound on top of the first streamer and the third streamer is wound on top of the second streamer.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1A:
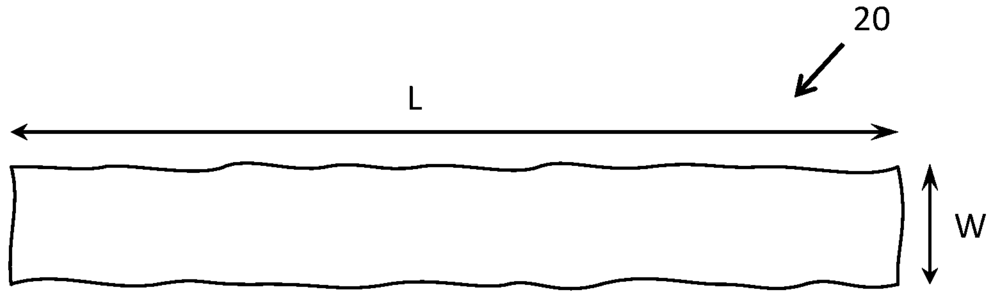
FIGS. 1A-1D show arrangements of an example streamer for use in the counter-swarm devices disclosed herein.

The present disclosure covers apparatuses and associated methods for a counter-swarm device. In the following description, numerous specific details are provided for a thorough understanding of specific preferred embodiments. However, those skilled in the art will recognize that embodiments can be practiced without one or more of the specific details, or with other methods, components, materials, etc. In some cases, well-known structures, materials, or operations are not shown or described in detail to avoid obscuring aspects of the preferred embodiments. Furthermore, the described features, structures, or characteristics may be combined in any suitable manner in a variety of alternative embodiments. Thus, the following more detailed description of the embodiments of the present invention, as illustrated in some aspects in the drawings, is not intended to limit the scope of the invention, but is merely representative of the various embodiments of the invention.

In this specification and the claims that follow, singular forms such as "a," "an," and "the" include plural forms unless the content clearly dictates otherwise. All ranges disclosed herein include, unless specifically indicated, all endpoints and intermediate values. In addition, "optional," "optionally," or "or" refer, for example, to instances in which subsequently described circumstance may or may not occur and include instances in which the circumstance occurs and instances in which the circumstance does not occur. The terms "one or more" and "at least one" refer, for example, to instances in which one of the subsequently described circumstances occurs, and to instances in which more than one of the subsequently described circumstances occurs.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, and devices may individually or collectively be components of a larger system, wherein other procedures may take precedence over or otherwise modify their application.

The detailed description of exemplary embodiments herein reference accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, with reference to the accompanying figures, the present disclosure generally provides for a counter-swarm device, system and/or methods. One example is directed to a counter-swarm device in the form of, for example, a firework. Other examples are directed to counter-UAV fireworks and/or firework systems, and related methods of operating the same.

The counter-swarm devices, systems and methods disclosed herein may make use of entanglement effectors or streamers intended to entangle within the propellers of a UAV. Various solutions disclosed herein illustrate the scalability of optimized entanglement effector technology for autonomous, area-based counter-swarm applications. The entanglement effector technologies may be implemented in the form of a firework or other device or system. For example, the streamers may be deployed using a manually operated device for launching a projectile into the air, wherein the projectile once launched deploys the streamers in an airspace where the UAV is or will be located. Other systems and methods may include autonomous features or functionality. For example, a system may detect the presence of a UAV within a predetermined airspace and launch one or more streamers into the airspace and/or adjacent to the airspace. The system may automatically detect the UAV, track the UAV, detect other environmental conditions such as wind speed or wind direction, and parameters such as the altitude, speed, and direction of the UAV, and then launch one or more streamers into or around the airspace in a direction or location that creates the best chance of the streamers interacting with the UAV propellers.

In some examples, the counter-swarm device is embodied as a mortar tube having a plurality of streamers positioned in the mortar tube, a cone positioned below the streamers, a kick charge intended to deploy the streamers out of the mortar tube, and other features and functionality that may best position the streamers in the airspace where the streamers can interact with the propellers of one or more UAVs.

FIG. 1A shows an example streamer 20 having a length L and a width W. The streamer 20 may have a relatively thin thickness that is significantly less than the width or length. In at least some arrangements, the length of the streamer 20 is in the range of about 2 inches to about 96 inches, and more particularly in the range of about 36 inches to about 72 inches. The width is typically in the range of about 0.5 inches to about 2 inches, and more particularly in the range of about 0.75 inches to about 1.5 inches.

The streamer 20 may be optimized for persistence in an airspace once deployed as an entanglement effector. For example, a longer and wider streamer comprising a lightweight material may fall through an airspace more gradually providing a persistent, volumetric effect. This creates a greater opportunity to act as an entanglement effector against an incoming UAV or swarm of UAVs. The streamer 20 may be pre-deformed to fall at a desired rate, or may be shaped in other ways like loops or figure eight shapes to affect its persistence in the air. The streamer 20 may also be optimized for entanglement, with features such as perforations, appendages, mass concentrations, drag concentrations, pre-deformations or other configurations designed to increase the likelihood of entangling a propeller.

The length of a streamer 20 may change based on the size and range of UAV being targeted. For example, a longer streamer in the range of about 96 inches to 400 inches may be more suitable for a fixed-wing UAV with a pusher propeller as the streamer 20, falling slowly through an airspace as an entanglement effector, may be configured to wrap around the front of the UAV and entangle the propeller at the back of the UAV as the UAV passes through the airspace. Alternatively, multiple long streamers, e.g., such as those described below or having a length greater than about 96 inches, may wrap around the wings or control surfaces of a fixed-wing UAV creating sufficient drag on the UAV to significantly degrade its flight performance or disable it from flying. A long streamer 20 may clog air intakes of UAVs with shielded propellers or jet intakes. A shorter streamer 20 may work well against smaller UAVs, allowing for more coverage given shell 100 or 102 payload constraints.

Figure 1B:
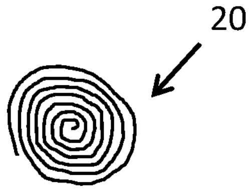
Figure 1C:
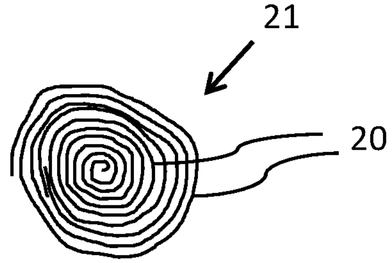
Figure 1D:
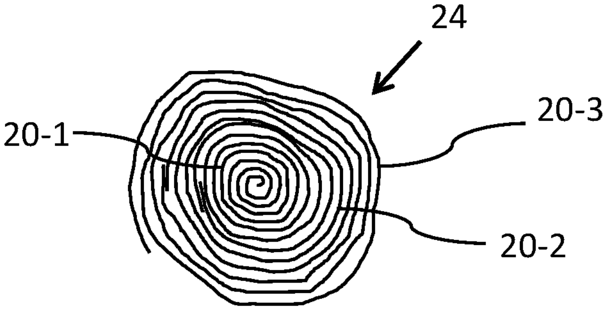

FIG. 1B shows a single streamer 20 rolled up as a single wound streamer. FIG. 1C shows a multi-wound streamer 21 that includes at least first and second streamers 20 that are wound one on top of the other. FIG. 1D illustrates another multi-wound streamer 24 that includes at least a first 20-1, second 20-2, and third streamers 20-3. The second 20-2 streamer is wound on top of the first 20-1 streamer and the third 20-3 streamer is wound on top of the second 202- streamer. Other arrangements may include more than three streamers 20 that are wound up into a different multi-wound streamer configuration. Multi-wound streamers 24 give designers added flexibility in delivery and distribution of deployed streamers 20.

Figure 2:
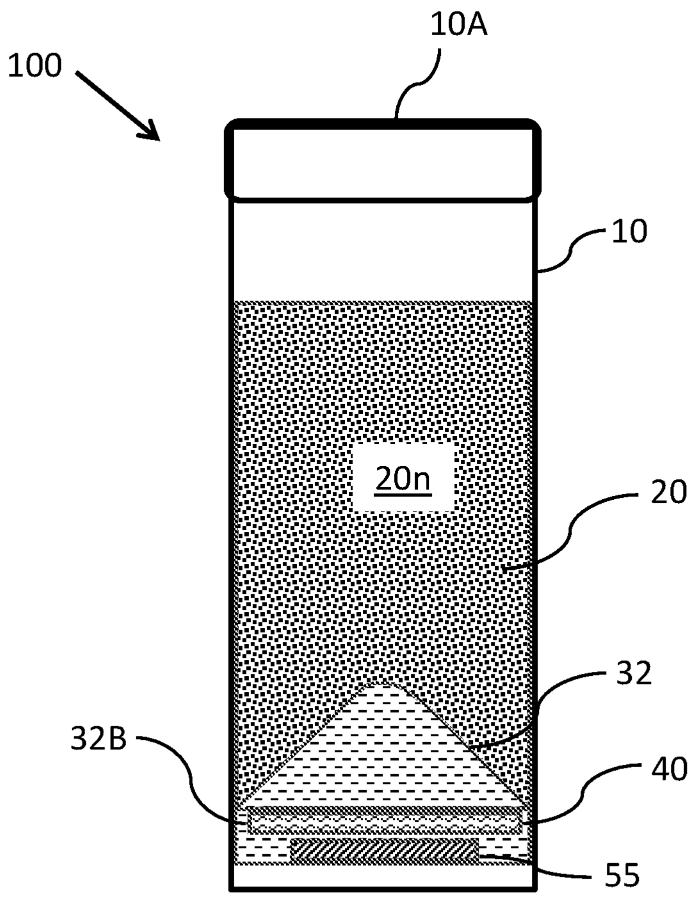
FIG. 2 illustrates a counter-swarm device.

FIG. 2 illustrates a counter-swarm device 100. Counter-swarm device 100 comprises a mortar tube 10 with an opening on one end 10A. Multiple streamers **20*n* are positioned in the mortar tube 10. A cone 32 is positioned below the multiple streamers 20*n* in the mortar tube 10. The cone 32 points towards the mortar-tube opening 10A. A kick charge 55 is positioned below the cone 32. The cone 32 is configured to disperse the multiple streamers 20*n* upon discharge of the kick charge 55**.

The counter-swarm device 100 may include other elements such as a fire suppression plate or wad 40. The fire suppression material 40 may be interposed spatially between the burst charge 45 and the streamers **20*n*. The fire suppression material 40 may provide a boundary or layer that protects the streamers 20*n* from heat damage resulting from the burst charge 45**. In some examples of the fire suppression material comprises a heat resistant material such as, for example, potassium bicarbonate, potassium bicarbonate with urea complex, or ammonium dihydrogen phosphate.

Figure 3A:
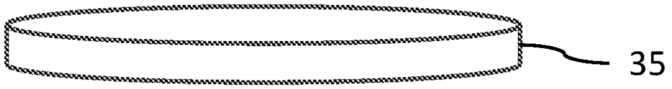
FIGS. 3A-3C show examples of a pusher plate and a cone for use in the counter-swarm devices disclosed herein.

FIG. 3A illustrates an alternate flat top 35 that may be used in place of the cone 32 within the counter-swarm device 100.

Figure 3B:
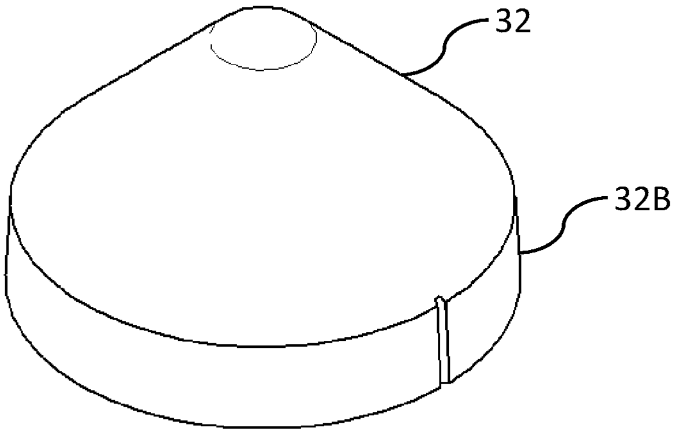

FIG. 3B illustrates an embodiment of a cone 32. In this depiction, cone 32 further includes a cylindrical body 32B. The purpose of the cone is to help disperse the multiple streamers **20*n* from the mortar tube 10. As described below, the angle of the cone shape helps distribute more broadly or into a larger volume the multiple streamers 20*n***. In embodiments, the angle of the cone shape is approximately 45 degrees. Other angles may also be used.

Figure 3C:
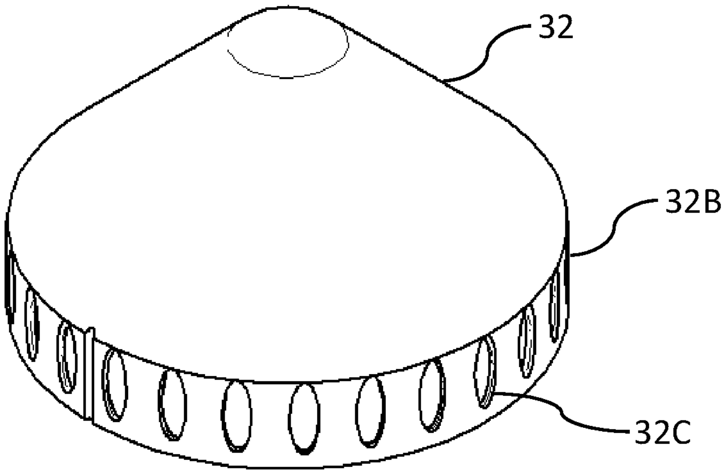

Another purpose of the cone 32 is to protect the multiple streamers 20*n* from the hot gasses created by the discharge of the kick charger 55. Hot gasses from the discharge of the kick charger 55 can melt the fragile streamers 20*n* such that they stick together and do not adequately disperse, deploy, or fall to the ground more quickly. FIG. 3C illustrates another embodiment of cone 32 where the cylindrical body 32B comprises venting holes 32C formed in the cylindrical body. The venting holes may be configured to radially direct hot gasses created by the discharge of the kick charge 55 away from the multiple streamers 20*n* in the counter-swarm device 100.

The cone 32 may be 3D printed from various materials such as polyethylene terephthalate glycol (PETG), acrylic styrene acrylonitrile (ASA), glass-filled nylon (GFN), or other materials. Alternatively, the cone 32 may be injection molded.

As mentioned previously and described in more detail below, the purpose of the cone 32 is to distribute the multiple streamers 20*n* into as large a volume as possible. The cone 32 may be manufactured such that it does not disintegrate or break apart upon discharge of the kick charge. In embodiments, the cone 32 should be stay intact upon discharge of the kick charge 55. The inventors of the present disclosure discovered that when the cone 32 remains intact, e.g., does not disintegrate from the explosive detonation of the kick charge 55, the cone 32 is able to better disperse the multiple streamers 20*n* into a larger streamer cloud 70 (shown in FIG. 5).

The inventors of the present disclosure conducted several experiments to optimize the size of a streamer cloud from the detonation of the kick charge 55 in the counter-swarm device 55. In the experiments, 540 individual streamers were triple rolled into 180 rolls and placed in a mortar tube 10. In some experiments, the multiple streamers 20*n* were loosely packed into the mortar tube 10, meaning, the multiple streamers 20*n* were poured into the mortar tube 10 without any effort to compact or compress the multiple streamers 20*n* together. In other experiments, the multiple streamers 20*n* were tightly packed into the mortar tube 10, meaning, the multiple streamers 20*n* were compressed together to minimize the volume occupied by the multiple streamers 20*n* in the mortar tube 10.

Below the multiple streamers 20*n* was placed either a cone 32 or a pusher plate 35 (illustrated in FIGS. 3A, 3B, and 3C). The cones 32 or pusher plates 35 were 3D printed using the materials described above. Other cones were injection molded. Some of the cones 32 disintegrated upon detonation of the kick charge 55. Other cones 32 remained intact upon detonation of the kick charge 55. The cones 32 that did not disintegrate on launch better protected the streamers from the heat of the kick charge. Because the counter-swarm device 10 is envisioned to be used around blue force or civilians, the cones 32 were designed to be light-weight such that they could fall to the ground from high heights at a slow terminal velocity and not cause any significant damage to persons or property.

Below the cone 32 or pusher plate 35 was placed a kick charge 55 comprising black powder. The inventors varied the amount of kick charge 55 or black powder in each of the experiments to help determine how much kick charge 55 or black powder might be used to disperse the multiple streamers 20*n* into a larger streamer cloud 70. The amount of black powder in the kick charge 55 varied in the experiments from between 50 and 150 grams. While the inventors used black powder as the kick charge 55, other smokeless powder may be used a kick charge 55.

Figure 4A:
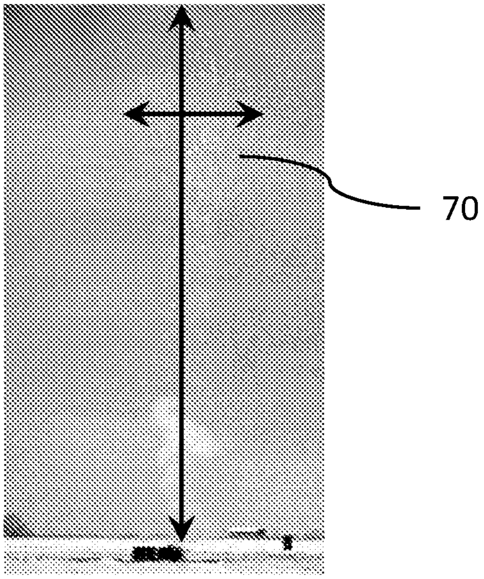
FIGS. 4A and 4B illustrate photographs of tests of the counter-swarm devices disclosed herein.
Figure 4B:
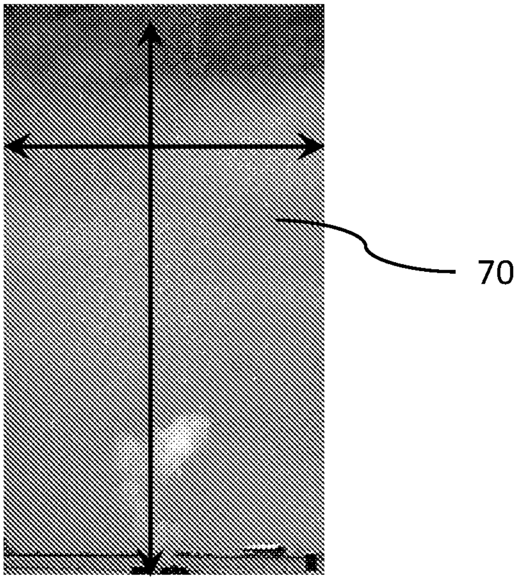

FIGS. 4A and 4B are two black-and-white photographs illustrating results from two of the experiments. The images in this disclosure are not significant except to illustrate the methods used by the inventors of the present disclosure to measure the effectiveness of the variables used to disperse the multiple streamers 20*n* into a streamer cloud 70. In the experiments, the inventors of the present disclosure placed a high-speed camera a fixed distance from the counter-swarm device 100 and filmed at 1000 frames-per-second the size of the streamer cloud 70 resulting from the various experiments.

Figure 5:
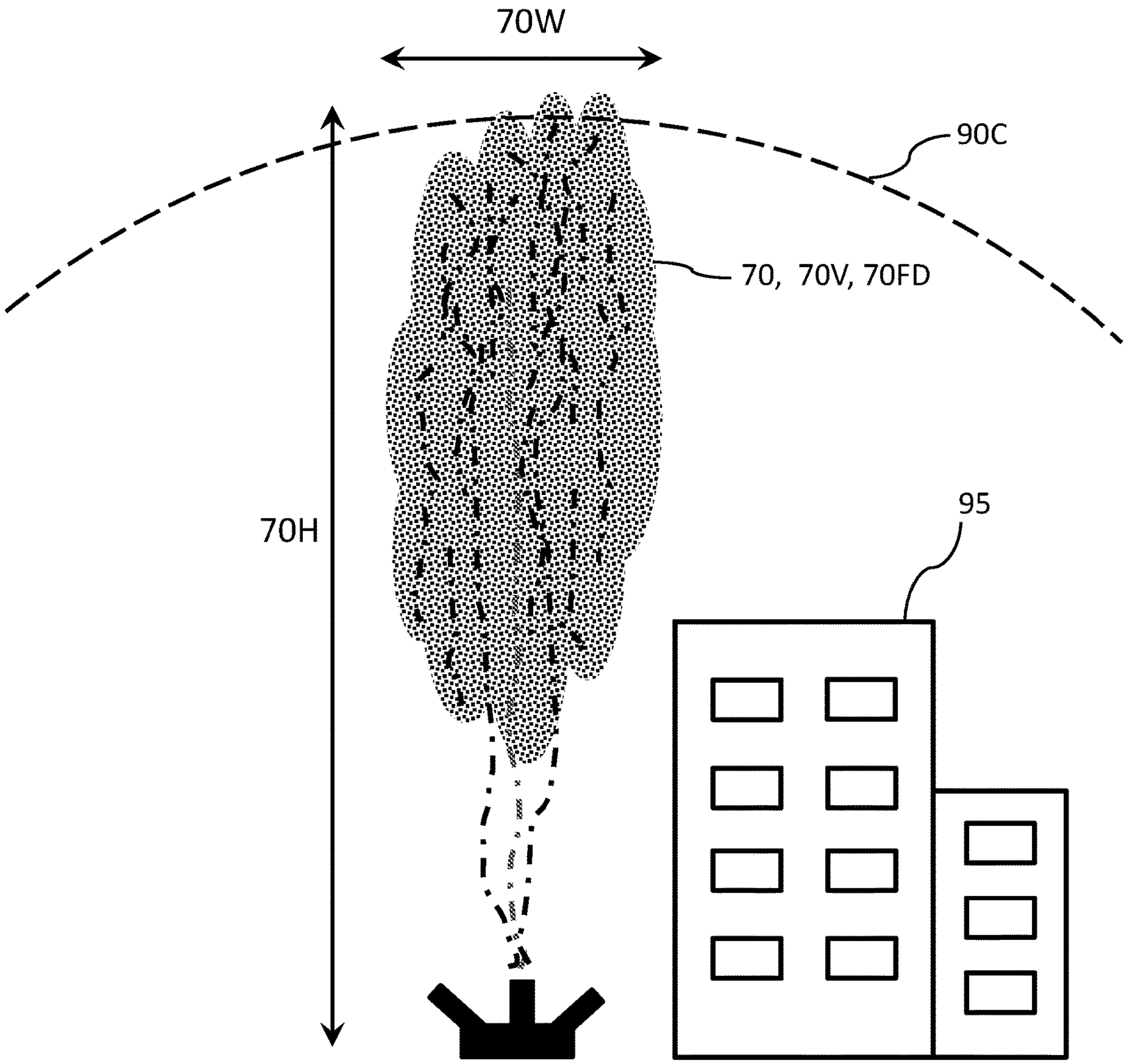
FIG. 5 illustrates how the size of a streamer cloud is calculated from the use of the counter-swarm devices disclosed herein.

The arrows in the images 4A and 4B indicate the relative size of the streamer cloud 70 at the time the streamer cloud 70 was at a full-deployment state 70FD. FIG. 5 illustrates a streamer cloud 70 at a full-deployment state 70FD. The full-deployment state 70FD occurs at the maximum height 70H and maximum width 70W of the streamer cloud 70 dispersion of the multiple streamers 20*n* caused by the counter-swarm device 100, or more particularly, from the kick charge 55 and the cone 32 or pusher plate 35. The full-deployment state 70FD also occurs immediately prior to ambient air currents producing an observable dispersion of the streamer cloud 70. This means that the size of the streamer could 70 at its full-deployment state 70FD is a result of the counter-swarm device 100 and not by ambient conditions, such as wind speed.

Table 1 provides the results from 12 experiments.

TABLE 1

| Experiment | 1 | 2 | 3 | 4 | 5 | 6 | 7 | 8 | 9 | 10 | 11 | 12 |
|---|---|---|---|---|---|---|---|---|---|---|---|---|
| Cone Type | Pusher Plate | Pusher Plate | Cone | Cone | Cone | Cone | Cone | Cone | Cone | Cone | Cone | Cone |
| Cone Material | | | PETG | PETG | ASA | ASA | GFN | GFN | GFN | GFN | GFN | GFN |
| Charge (g) | 125 | 150 | 100 | 125 | 125 | 150 | 50 | 75 | 100 | 125 | 150 | 150 |
| Packing | | | | | | | | | | | Loose | Tight |
| Real-Time to Full Deployment (S) | 0.99 | 0.84 | 1.04 | 0.82 | 0.8 | 0.77 | 0.7 | 0.77 | 0.7 | 0.72 | 0.82 | 0.77 |
| Column Height (m) | 26.2 | 26.8 | 29.4 | 28.7 | 28.6 | 27.7 | 34.3 | 30.7 | 30 | 30.2 | 30.5 | 29.9 |
| Column Width (m) | 6.3 | 5 | 10 | 12.3 | 12.2 | 12.8 | 12.5 | 8.6 | 7.7 | 7.7 | 16 | 11 |
| Column Area (m^2) | 31 | 20 | 79 | 119 | 117 | 129 | 123 | 58 | 47 | 47 | 201 | 95 |

TABLE 1-continued

| Experiment | 1 | 2 | 3 | 4 | 5 | 6 | 7 | 8 | 9 | 10 | 11 | 12 |
|---|---|---|---|---|---|---|---|---|---|---|---|---|
| Column Volume (m^3) | 817 | 526 | 2309 | 3410 | 3343 | 3564 | 4209 | 1783 | 1397 | 1406 | 6132 | 2841 |

As shown in Table 1, experiments 1 and 2 used a pusher plate 35. The remaining experiments used a cone 32. The cone 32 material and the amount of charge (in grams) of the kick charge 55 is recorded in each of the experiments. Whether the multiple streamers 20*n* were loosely or tightly packed was only recorded in the last two experiments.

The real-time to full deployment was measured in seconds from the time of the kick charge 55 detonation to the time of the streamer cloud full-deployment state 70FD.

The streamer cloud 70 column volume 70V at the streamer cloud full-deployment state 70FD is calculated in the last row from the column height or streamer cloud height 70H and the column width or streamer cloud width or diameter 70W. To simplify the measurements, it is assumed that the streamer cloud 70 forms into a cylinder shape at streamer cloud full-deployment state 70FD such that the column area or streamer cloud area is a function of the streamer cloud width or diameter 70W (π*70W^2/4).

As noted in comparing experiments 1 and 2 with 5 and 6, the volume 70V of the streamer cloud 70 at the full-deployment state 70FD were at least four times larger using the cone 32 as opposed to the pusher plate 35, even when equivalent amounts of charge were used as the kick charge 55. For experiments using the cone 32, even the smallest of the streamer clouds 70 at the full-deployment state 70FD was nearly twice as large in experiment 9 (1397 m^3) as the streamer cloud 70 at its full-deployment state 70FD in experiment 1, using the pusher plate 35. Therefore, the kick charge 55 and the cone 32 may be configured to disperse the multiple streamers 20*n* at a full-deployment state 70FD into a streamer-cloud volume 70V greater than 1397 m^3.

Experiment 11 showed that a counter-swarm device 100 with a cone 32 and loosely packed streamers 20*n* produced the largest volume 70V of a streamer cloud 70 at the full-deployment state 70FD. That streamer cloud 70 had a streamer cloud volume of over 6000 m^3, more than an order of magnitude larger than the streamer cloud 70 from experiment 2 with a pusher plate 35.

FIG. 5 also illustrates a typical range, or a close range 90C, that may be used for the counter-swarm device, such as counter-swarm device 100. In Table 1, the streamer cloud height 70H ranges from about 26 meters to 34 meters. At this height (elevation), a streamer 20 within streamer cloud 70 can begin to entangle UAV propellers that may be approaching a building 95 or people, thus disabling a UAV intended to harm buildings 95, equipment, or people within a close range 90C.

Figure 6:
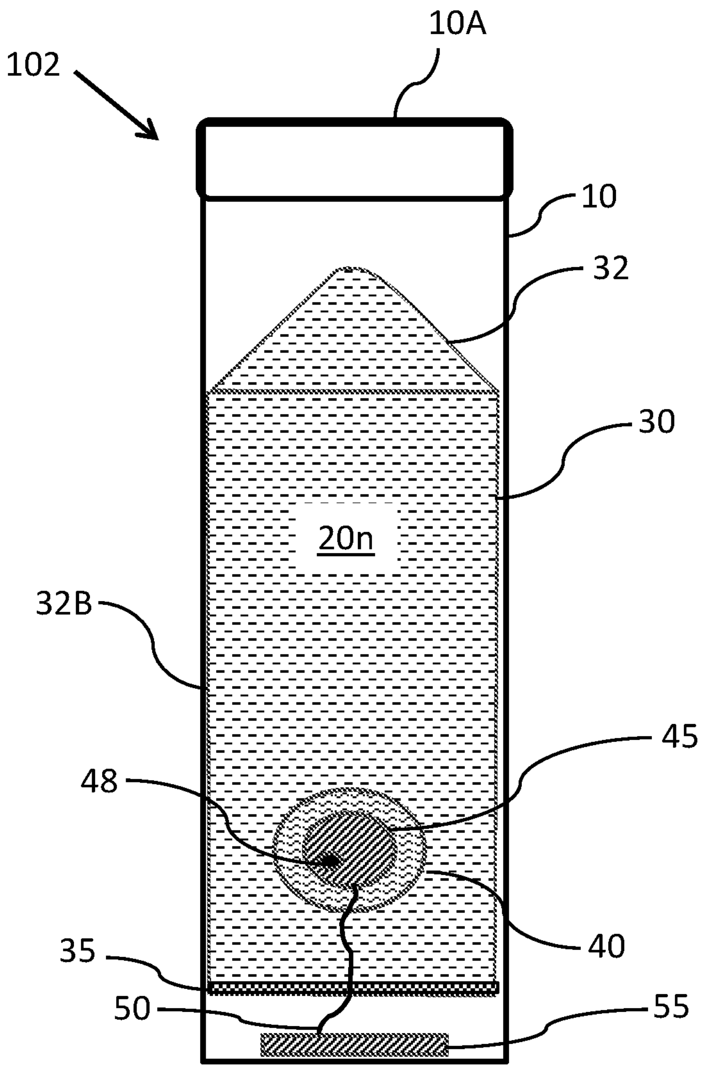
FIG. 6 illustrates another embodiment of a counter-swarm device.

FIG. 6 illustrates another embodiment of a counter-swarm device 102. In counter-swarm device 102, the cone 32 is part of a shell casing 30 and the multiple streamers 20*n* are positioned within the shell casing 30. The kick charge 55 is configured to launch the shell casing 30 and the multiple streamers 20*n* within the shell casing 30. A burst charge 45 is positioned within the shell casing 30 and surrounded by the multiple streamers 20*n*. The burst charge 45 is configured to disperse the multiple streamers 20*n* when discharged.

In other embodiments, a fire suppression wad 40 may be positioned between the burst charge 45 and the multiple streamers 20*n*. When used, the fire suppression wad 40 is configured to suppress heat generated by the discharge of the burst charge 45.

In addition, a pusher plate 35 may be used between the kick charge 55 and the shell casing 30 or cylindrical body 32B to protect the shell casing 30 or cylindrical body 32B from the effects of detonating the kick charge 55.

FIG. 6 also illustrates a timed fuse 50 and a timer or programmed detonator 48. A timed fuse 50 or a timer/programmed detonator 48 may be configured to detonate the burst charge 45 at a predetermined time after the shell casing 30 or cylindrical body 32B leaves the mortar tube 10 from the detonation of the kick charge 55.

The kick charge 55 may be used to launch the shell casing 30 or cylindrical body 32B to a desired elevation. Operating the kick charge 55 may also ignite a timed fuse 50. The timed fuse 50 may be configured such that the burst charge 45 will ignite when the shell casing 30 or cylindrical body 32B is at its maximum height based on the parameter of the kick charge 55 and parameters of the remaining portions of the shell 100 (i.e., the size, weight, shape, etc.). The timed fuse 50 may also be configured to detonate the burst charge 45 at a pre-determined elevation and time necessary for the streamers 20*n* to occupy the anticipated airspace of an incoming UAV or swarm of UAVs.

Figure 7:
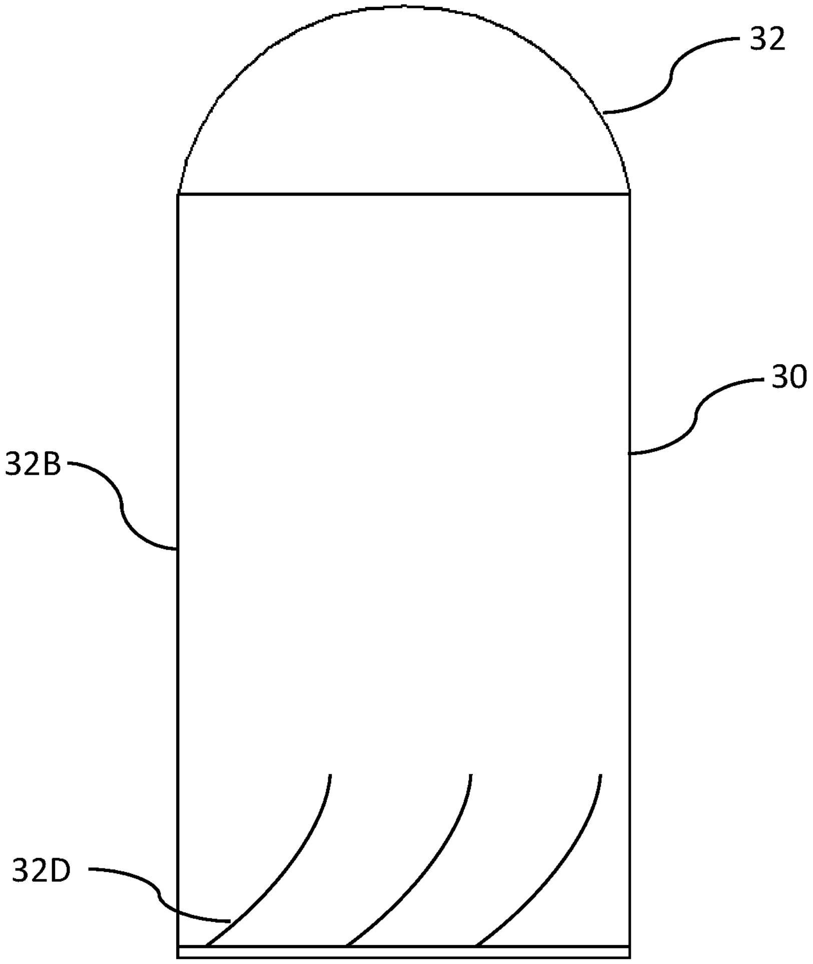
FIG. 7 illustrates a shell casing or cylindrical body for use in the counter-swarm devices disclosed herein.

FIG. 7 illustrates another embodiment of a shell casing 30. In embodiments, shell casing 30 or cylindrical body 32B may include rotating bands 32D that are configured to spin the shell casing 30 as it exits the mortar tube 10. Spinning the shell casing 30 produces a rifling effect thought to make the trajectory of the shell casing 30 more accurate when the shell casing 30 is discharged from the mortar tube 10 as a result of the detonation of the kick charge 55.

Figure 8A:
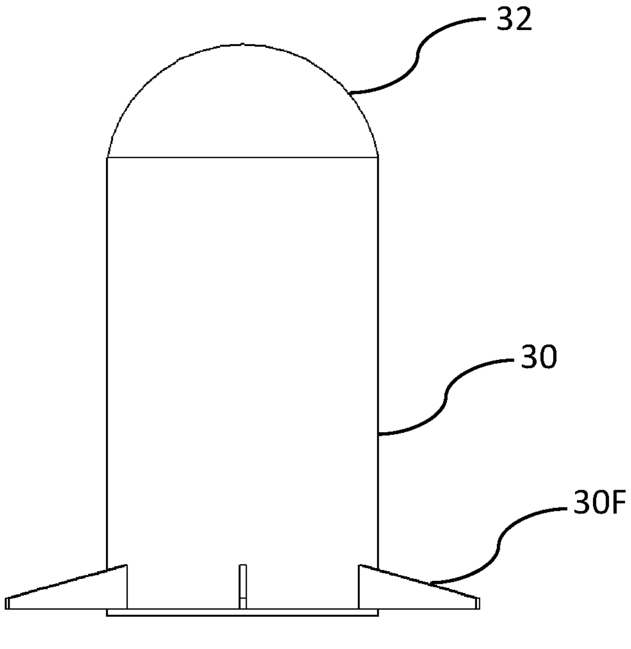
FIGS. 8A and 8B illustrate other embodiments of a shell casing or cylindrical body for use in the counter-swarm devices disclosed herein.
Figure 8B:
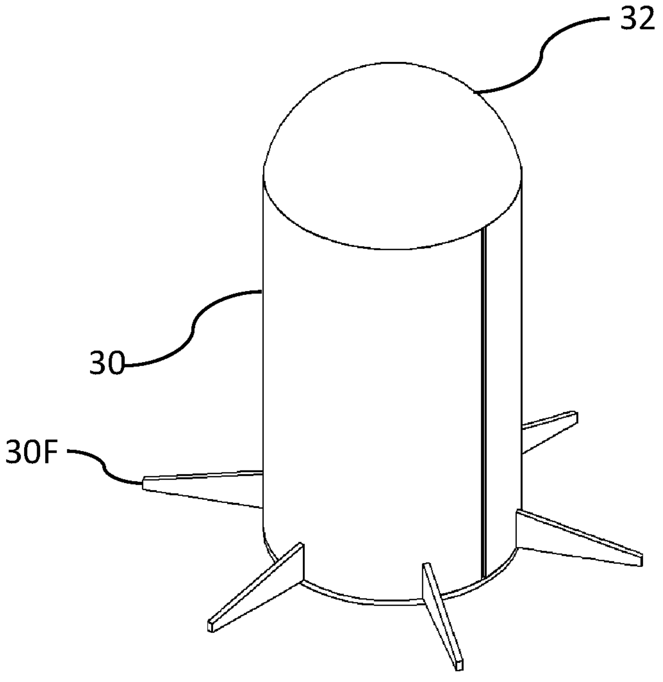

FIGS. 8A and 8B illustrate another embodiment of a shell casing 30. In embodiments, shell casing 30 may include fins 30F that are configured to direct the shell casing 30 as it exits the mortar tube 10. The fins 30F may be configured to deploy from shell casing 30 after the shell casing 30 exits the mortar tube. The fins 30F are thought to make the trajectory of the shell casing 30 more accurate when the shell casing 30 is discharged from the mortar tube 10 as a result of the detonation of the kick charge 55.

Figure 9:
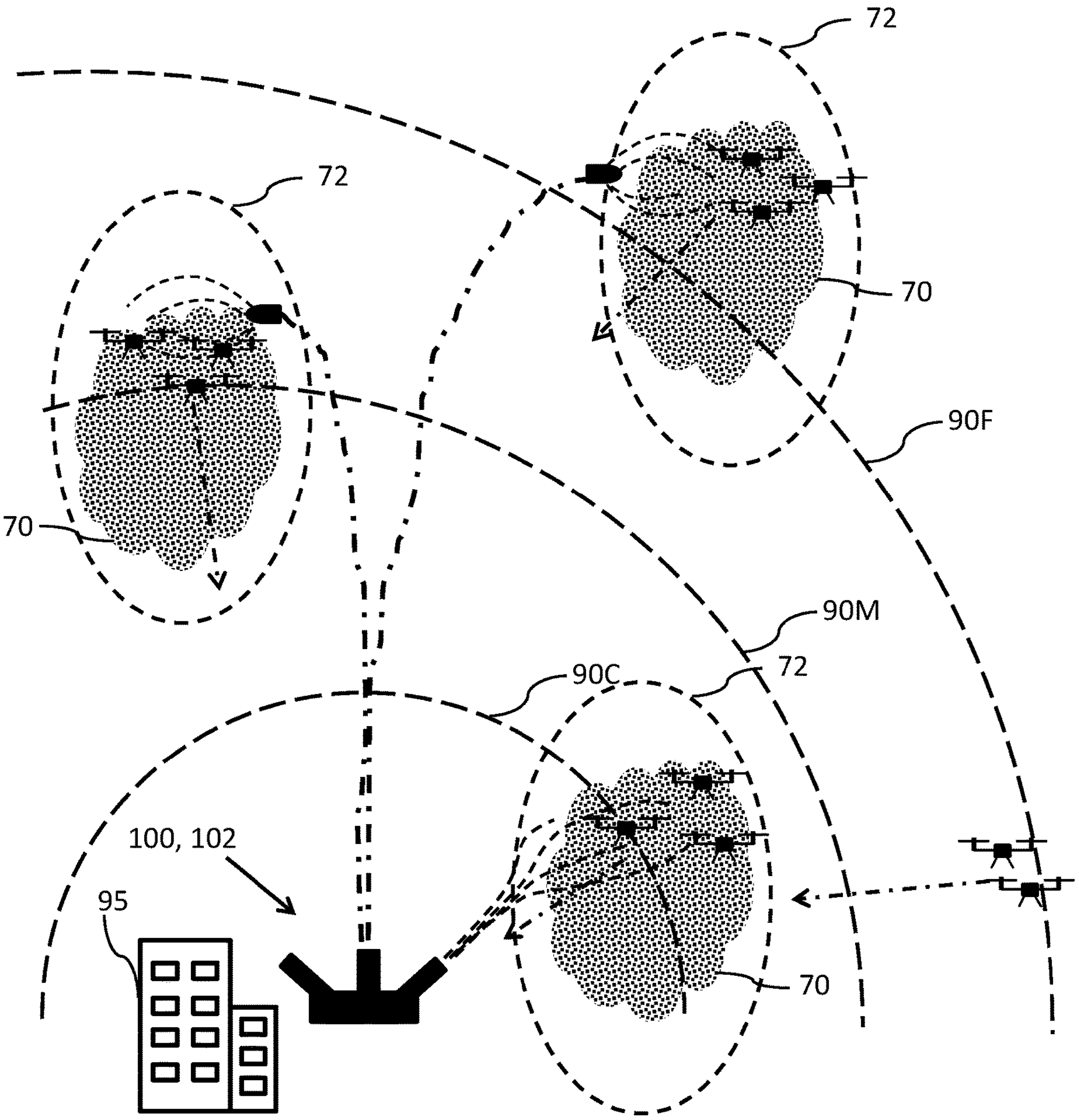
FIG. 9 illustrates a counter-swarm device used at various ranges against drone swarms.

FIG. 9 illustrates how various counter-swarm devices 100 or 102 may be used to protect buildings 95, equipment, or people, from a close range 90C, a medium range 90M, or a far range 90F. In each embodiment, the counter-swarm device 100 or 102 creates a streamer cloud 70 intended to entangle a UAV or swarm of UAVs. The UAC or swarm of UAVs may be detected in a predetermined airspace 72, which corresponds to a close range 90C, a medium range 90M, or a far range 90F.

Figure 10:
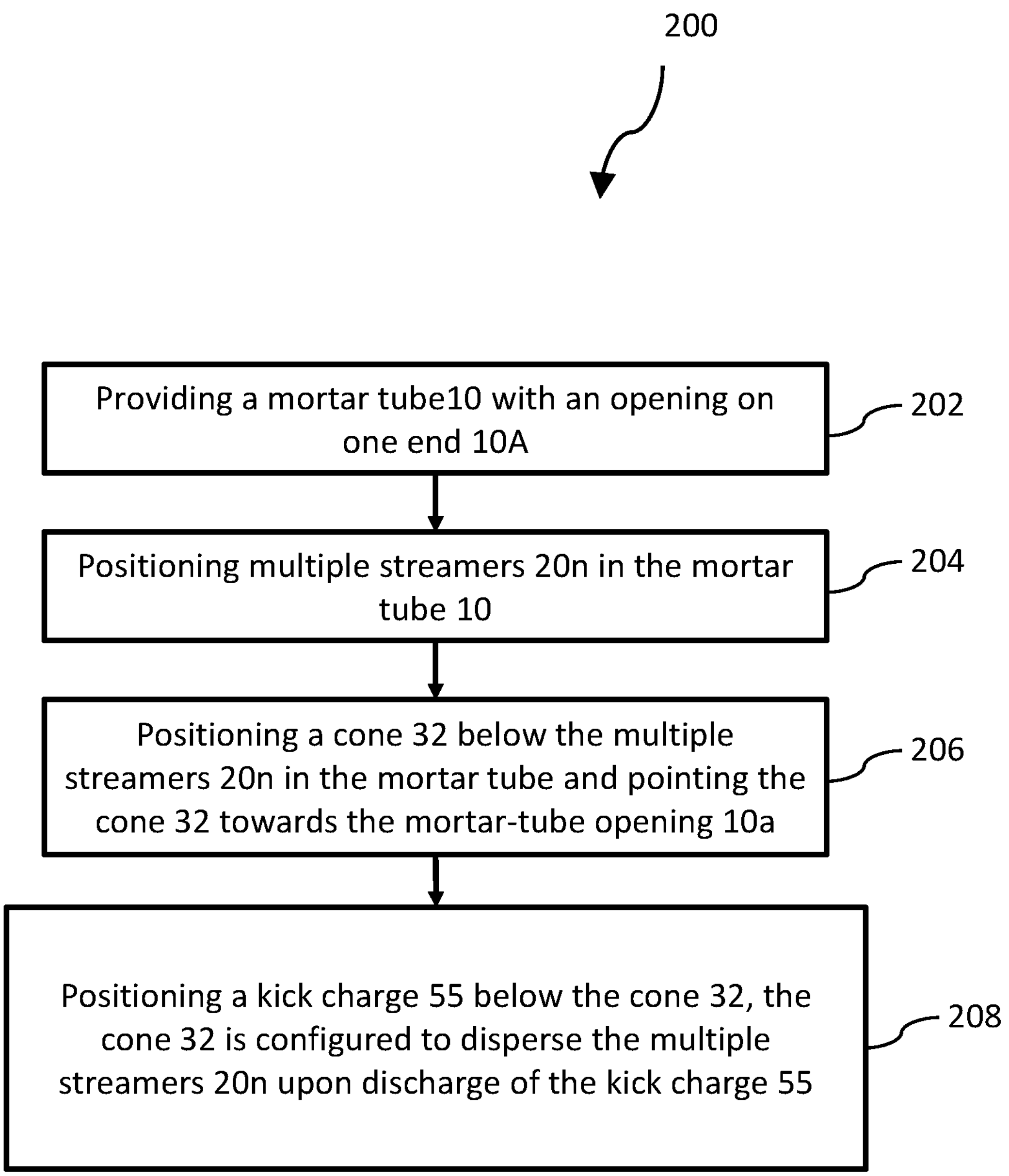
FIG. 10 illustrates a method for providing a counter-swarm device.

FIG. 10 illustrates a method 200 for providing a providing a counter-swarm device 100. In this embodiment, the method 200 comprises the step 202 of providing a mortar tube 10 with an opening on one end 10A. The method 200 further comprises the step 24 of positioning multiple streamers 20*n* in the mortar tube 10; the step 206 of positioning a cone 32 below the multiple streamers (20*n*) in the mortar tube and pointing the cone 32 towards the mortar-tube opening 10*a*. The method 200 further comprises the step 208 of positioning a kick charge 55 below the cone 32. In method 200, the cone 32 is configured to disperse the multiple streamers 20*n* upon discharge of the kick charge 55.

Figure 11:
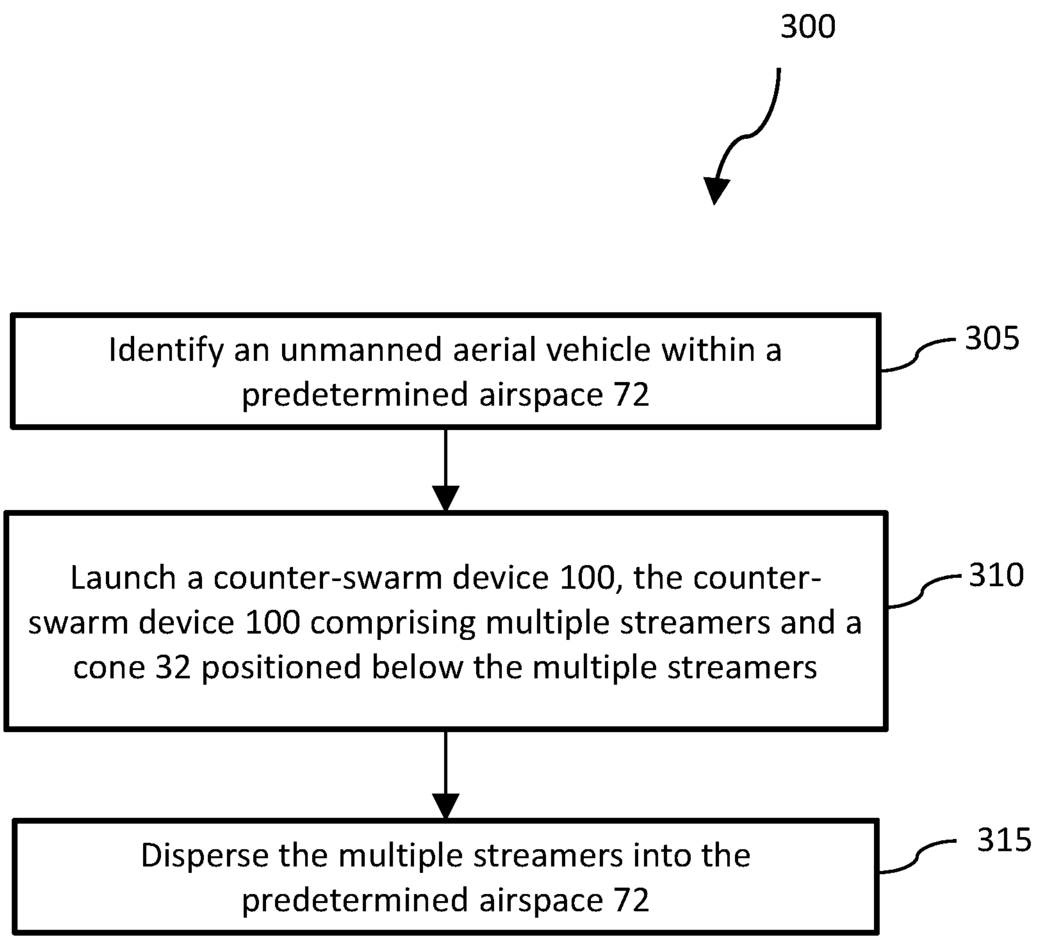
FIG. 11 illustrates a method for using a counter-swarm device.

FIG. 11 illustrates a method 300 for using a counter-swarm device. In this embodiment, method 300 includes the step 305 of identifying an unmanned aerial vehicle within or about to enter a predetermined airspace. Method 300 further includes the step 310 of launching a counter-swarm device 100, the counter-swarm device 100 comprising multiple streamers and a cone 32 positioned below the multiple streamers. Also, method 300 includes the step 315 of dispersing the multiple streamers into the predetermined airspace.

It will be appreciated that several of the above-disclosed and other features and functions, or alternatives thereof, may be desirably combined into many other different systems or applications. Also, various presently unforeseen or unanticipated alternatives, modifications, variations, or improvements therein may be subsequently made by those skilled in the art and are also intended to be encompassed by the following claims.

The present invention may be embodied in other specific forms without departing from its spirit or essential characteristics. The described embodiments are to be considered in all respects only as illustrative, and not restrictive. All changes which come within the meaning and range of equivalency of the foregoing description are to be embraced within the scope of the invention.

We claim:

1. A counter-swarm device, comprising:

a mortar tube with an opening on one end;

multiple streamers positioned in the mortar tube;

a cone positioned below the multiple streamers in the mortar tube, the cone pointing towards the mortar-tube opening;

a kick charge positioned below the cone;

wherein the cone is configured to disperse the multiple streamers upon discharge of the kick charge.

2. The counter-swarm device of claim 1, wherein:

the cone further includes a cylindrical body extending below the cone; and the cone and its cylindrical body contain a fire-suppressant wad and the kick charge is positioned below the fire-suppressant wad.

3. The counter-swarm device of claim 1, wherein the cylindrical body comprises venting holes formed in the cylindrical body and configured to direct away from the multiple streamers hot gasses created by the discharge of the kick charge.

4. The counter-swarm device of claim 1, wherein:

the cone is part of a shell casing;

the multiple streamers are positioned within the shell casing;

the kick charge is configured to launch the shell casing and the multiple streamers within the shell casing; and a burst charge is positioned within the shell casing, surrounded by the multiple streamers, and configured to disperse the multiple streamers when discharged.

5. The counter-swarm device of claim 4, further comprising a fire-suppression wad positioned between the burst charge and the multiple streamers, the fire suppression wad is configured to suppress heat generated by the discharge of the burst charge.

6. The counter-swarm device of claim 4, wherein the shell casing further comprises rotating bands configured to spin the shell casing as it exits the mortar tube.

7. The counter-swarm device of claim 4, wherein the shell casing further comprises fold-out fins configured to fold out from the shell casing and spin the shell casing after exiting the mortar tube.

8. The counter-swarm device of claim 1, wherein the kick charge and the cone are configured to disperse the multiple streamers at a full-deployment state into a streamer-cloud volume greater than 1397 m^3.

9. The counter-swarm device of claim 1, wherein the kick charge comprises more than 100 grams of black powder.

10. The counter-swarm device of claim 1, wherein at least one of the multiple streamers comprises at least a first, second, and third streamer, the second streamer wound on top of the first streamer and the third streamer wound on top of the second streamer.

11. A method for providing a counter-swarm device, the method comprising:

providing a mortar tube with an opening on one end;

positioning multiple streamers in the mortar tube;

positioning a cone below the multiple streamers in the mortar tube and pointing the cone towards the mortar-tube opening;

positioning a kick charge below the cone;

wherein the cone is configured to disperse the multiple streamers upon discharge of the kick charge.

12. The method of claim 11, wherein:

the cone further includes a cylindrical body extending below the cone; and the cone and its cylindrical body contain a fire-suppressant wad and the kick charge is positioned below the fire-suppressant wad.

13. The method of claim 11, wherein the cylindrical body comprises venting holes formed in the cylindrical body and configured to direct away from the multiple streamers hot gasses created by the discharge of the kick charge.

14. The method of claim 11, wherein:

the cone is part of a shell casing;

the multiple streamers are positioned within the shell casing;

the kick charge is configured to launch the shell casing and the multiple streamers within the shell casing; and a burst charge is positioned within the shell casing, surrounded by the multiple streamers, and configured to disperse the multiple streamers when discharged.

15. The method of claim 14, further comprising positioning a fire-suppression wad between the burst charge and the multiple streamers and the fire suppression wad is configured to suppress heat generated by the discharge of the burst charge.

16. The method of claim 14, wherein the shell casing further comprises rotating bands configured to spin the shell casing as it exits the mortar tube.

17. The method of claim 14, wherein the shell casing further comprises fold-out fins configured to fold out from the shell casing and spin the shell casing after exiting the mortar tube.

18. The method of claim 11, wherein the kick charge and the cone are configured to disperse the multiple streamers at a full-deployment state into a streamer-cloud volume greater than 1397 m^3.

19. The method of claim 11, wherein the kick charge comprises more than 100 grams of black powder.

20. The method of claim 11, wherein at least one of the multiple streamers comprises at least a first, second, and third streamer, the second streamer wound on top of the first streamer and the third streamer wound on top of the second streamer.

* * * * *